United States Patent
Hama et al.

(10) Patent No.: US 10,249,880 B2
(45) Date of Patent: Apr. 2, 2019

(54) METHOD FOR MANUFACTURING CURRENT COLLECTOR AND METHOD FOR MANUFACTURING SOLID BATTERY

(71) Applicant: TOYOTA JIDOSHA KABUSHIKI KAISHA, Toyota-shi, Aichi-ken (JP)

(72) Inventors: Shigenori Hama, Sunto-gun (JP); Hideyo Ebisuzaki, Toyota (JP); Yasumasa Oguma, Tokyo (JP); Satoshi Wakasugi, Gotenba (JP)

(73) Assignee: TOYOTA JIDOSHA KABUSHIKIA KAISHA, Toyota (JP)

( * ) Notice: Subject to any disclaimer, the term of this patent is extended or adjusted under 35 U.S.C. 154(b) by 175 days.

(21) Appl. No.: 15/384,989

(22) Filed: Dec. 20, 2016

(65) Prior Publication Data
US 2017/0207460 A1    Jul. 20, 2017

(30) Foreign Application Priority Data

Jan. 18, 2016  (JP) ................................ 2016-007350

(51) Int. Cl.
| H01M 4/04 | (2006.01) |
| H01M 4/66 | (2006.01) |
| H01M 4/139 | (2010.01) |
| H01M 10/0525 | (2010.01) |
| H01M 10/0562 | (2010.01) |

(52) U.S. Cl.
CPC ......... *H01M 4/667* (2013.01); *H01M 4/0404* (2013.01); *H01M 4/139* (2013.01); *H01M 4/663* (2013.01); *H01M 4/668* (2013.01); *H01M 10/0525* (2013.01); *H01M 10/0562* (2013.01)

(58) Field of Classification Search
CPC ...... H01M 4/663; H01M 4/665; H01M 4/667; H01M 4/668; H01M 4/139; H01M 4/0404; H01M 10/0562; H01M 10/0525
See application file for complete search history.

(56) References Cited

U.S. PATENT DOCUMENTS

| 2013/0143117 A1* | 6/2013 | Koh ....................... H01G 11/30 429/211 |
| 2014/0212767 A1* | 7/2014 | Suzuki .............. H01M 10/0525 429/304 |

(Continued)

FOREIGN PATENT DOCUMENTS

| JP | H11-144704 A | 5/1999 |
| JP | 2001-357854 A | 12/2001 |
| JP | 2004-134304 A | 4/2004 |

(Continued)

*Primary Examiner* — Eugenia Wang
(74) *Attorney, Agent, or Firm* — Oliff PLC

(57) ABSTRACT

Provided is a method for manufacturing a current collector provided with a conductive layer that can keep a high resistance only at a high temperature. The method includes dispersing a carbon material in an organic solvent to prepare a carbon material dispersion solution, dispersing polyvinylidene fluoride in an organic solvent to prepare a resin dispersion solution, mixing the carbon material dispersion solution, the resin dispersion solution, and water, to prepare a composition for conductive layer formation, and forming a conductive layer on a surface of a current collector by applying the composition for conductive layer formation and thereafter drying the composition.

7 Claims, 7 Drawing Sheets

(56) References Cited

U.S. PATENT DOCUMENTS

2015/0280241 A1* 10/2015 Hara .................. H01G 11/66
                                                    429/233
2015/0303484 A1* 10/2015 Iida .................. H01G 11/68
                                                    429/233

FOREIGN PATENT DOCUMENTS

| JP | 2004-327183 A | 11/2004 | | |
| JP | 2005-086038 A | 3/2005 | | |
| JP | 2012-104422 A | 5/2012 | | |
| WO | WO-2014050653 A1 * | 4/2014 | ............. | H01G 11/66 |
| WO | WO-2014077384 A1 * | 5/2014 | ............. | H01G 11/68 |

* cited by examiner

METHOD FOR MANUFACTURING CURRENT COLLECTOR AND METHOD FOR MANUFACTURING SOLID BATTERY

TECHNICAL FIELD

The present disclosure relates to a method for manufacturing a current collector and a method for manufacturing a solid battery including the current collector manufactured by the method.

BACKGROUND

Metal ion secondary batteries provided with a solid electrolyte layer including a solid electrolyte (e.g. lithium ion secondary battery. Hereinafter it may be referred to as "solid battery") has advantages, for example it can easily simplify the system for enduring the safety.

As a technique related to such a solid battery, for example Patent Literature 1 discloses a method for manufacturing a non-aqueous secondary battery including: producing an electrode with conductive layer including an electrode mixture that includes an electrode active material, a current collector that keeps the electrode mixture, and a conductive layer arranged between the current collector and the electrode mixture; and forming a non-aqueous secondary battery including the electrode with conductive layer as at least one of a cathode and an anode. Patent Literature 1 shows that the conductive layer is formed to the electrode by applying a composition for conductive material formation onto the current collector and drying it. The composition is prepared by dispersion of polyvinylidene fluoride (hereinafter may be referred to as "PVDF") and, if necessary, another polymer than PVDF, into an organic solvent.

Patent Literature 2 discloses a non-aqueous secondary battery wherein: a current collector of a cathode and/or anode is coated with a conductive layer that includes a crystalline thermoplastic resin having a function of a positive temperature coefficient resistor in which the resistance value increases as temperature increases, a conductive material, and a binder; and the thickness of the conductive layer is 0.1 μm to 5.0 μm. Patent Literature 2 shows that the conductive layer is formed on the current collector by application of acetylene black and polyethylene dispersed in N-methyl-2-pyrrolidone (NMP) in which PVDF is dissolved, thereafter drying and removing the NMP solvent.

Patent Literature 3 discloses a solid battery in which a PTC (Positive Temperature Coefficient) element is connected between: at least one of a cathode terminal and an anode terminal of the battery; and an electrode to be connected to the terminal, in an electrical bath. Patent Literature 4 discloses a battery wherein at least one of active material layers provided both sides of a separator includes a material that has a reaction cut function or a current cut function at 90° C. to 160° C. Patent Literature 4 discloses that a solid electrolyte film can be used as the separator. Patent Literature 5 discloses a method for manufacturing a P-PTC thermistor composition including: preparing a kneaded mixture at least including a thermoplastic resin and a conductive particle; and contacting the kneaded mixture to water.

CITATION LIST

Patent Literatures

Patent Literature 1: JP 2012-104422 A
Patent Literature 2: JP 2001-357854 A
Patent Literature 3: JP H11-144704 A
Patent Literature 4: JP 2004-327183 A
Patent Literature 5: JP 2005-86038 A

SUMMARY

Technical Problem

The conductive layer produced by the method disclosed in Patent Literature 1 increases its resistance as the temperature increases when the temperature is less than a predetermined temperature (e.g. around 190° C.). However, when the temperature reaches the predetermined temperature, the resistance rapidly decreases, and thereafter keeps a low state even though the temperature increases more. In the conductive layer that contains polyethylene and is produced in the method disclosed in Patent Literature 2, the polyethylene is difficult to be uniformly dispersed. Thus, in the conductive layer, a portion where the resistance easily increases and the portion where the resistance is difficult to increase are easily mixed. The composition produced by the method disclosed in Patent Literature 5 has a resistance higher than that of the conductive layers produced by the methods disclosed in Patent Literatures 1 and 2. Thus, if the composition is used in a battery, it is difficult to improve the performance of the battery. These problems are difficult to be solved even though the techniques disclosed in Patent Literatures 1 to 5 are combined.

An object of the present disclosure is to provide a method for manufacturing a current collector provided with a conductive layer that can keep a high resistance only at a high temperature, and a method for manufacturing a solid battery provided with the current collector manufactured by the method.

Solution to Problem

The inventors of the present disclosure produced a conductive material layer via a process of mixing water, a carbon material, PVDF, and an organic solvent. This conductive layer had a resistance same as or smaller than the resistance of the conductive layer produced by the method of Patent Literature 1 at a temperature of no more than 150° C. When the temperature got higher than 150° C., the resistance started to increase, and kept increasing until the temperature reached at least 220° C., and kept the resistance at 220° C. From this result, the inventors of the present disclosure found that a conductive layer produced via the process of mixing water, a carbon material, PVDF, and an organic solvent keeps a high resistance only at a high temperature of over 150° C. The present disclosure is completed based on the above finding.

In order to solve the above problem, the present disclosure is directed to the following embodiments. That is, a first embodiment of the present disclosure is a method for manufacturing a current collector including: dispersing a carbon material in an organic solvent to prepare a carbon material dispersion solution; dispersing polyvinylidene fluoride in an organic solvent to prepare a resin dispersion solution; mixing the carbon material dispersion solution, the resin dispersion solution, and water, to prepare a composition for conductive layer formation; and forming a conductive layer on a surface of a current collector by applying the composition for conductive layer formation on the current collector and thereafter drying the composition.

By the reaction of PVDF dispersed in the organic solvent and water, PVDF precipitates while bubbling. This changes the property of PVDF. The conductive layer that includes the carbon material which is a conductive material and the PVDF whose property is changed can keep a high resistance only at a high temperature (e.g. no less than 150° C. The same is applied hereinafter). Thus, by forming such a conductive layer on the surface of the current collector, it is possible to manufacture a current collector including a conductive layer that can keep a high resistance only at a high temperature.

A second embodiment of the present disclosure is A method for manufacturing a solid battery, the solid battery including: a cathode layer including a cathode active material layer and a cathode current collector; an anode layer including an anode active material layer and an anode current collector; and a solid electrolyte layer arranged between the cathode active material layer and the anode active material layer, wherein at least one of the cathode current collector and the anode current collector is manufactured by the method for manufacturing a current collector according to the first embodiment, the method for manufacturing a solid battery including: when the cathode current collector is manufactured by the method for manufacturing a current collector according to the first embodiment, stacking the cathode active material layer and the current collector in a manner to make the conductive layer formed on the surface of the current collector and the cathode active material layer have contact with each other; when the anode current collector is manufactured by the method for manufacturing a current collector according to the first embodiment, stacking the anode active material layer and the current collector in a manner to make the conductive layer formed on the surface of the current collector and the anode active material layer have contact with each other.

According to the second embodiment of the present disclosure, it is possible to manufacture a solid battery including the current collector manufactured by the above first embodiment of the present disclosure. The current collector manufactured by the above first embodiment of the present disclosure can keep a high resistance only at a high temperature, under the environment in which a restrictive pressure is applied to the current collector. Here, the solid battery is used in a state in which a restrictive pressure is applied in the direction to make the cathode current collector and the anode current collector close to each other, in order to reduce the battery resistance. When the temperature of the battery excessively increases, it is effective to stop the battery reaction for securing the safety. The current collector manufactured by the above first embodiment of the present disclosure has a high resistance only at a high temperature, therefore it gets easy to secure the safety of the solid battery by including such a current collector. Thus, according to the second embodiment of the present disclosure, it is possible to manufacture a solid battery whose safety is easily secured.

It is possible to provide a method for manufacturing a current collector provided with a conductive layer that can keep a high resistance only at a high temperature and a method for manufacturing a solid battery provided with the current collector manufactured by the method.

DESCRIPTION OF EMBODIMENTS

Hereinafter the present disclosure will be explained with reference to the drawings. It is noted that the embodiments shown below are examples of the present disclosure and the present disclosure is not limited to these embodiments. In the following explanation, the current collector manufactured by the method for manufacturing a current collector of the present disclosure may be referred to as "current collector with conductive layer".

1. Method for Manufacturing Current Collector

Figure 1:
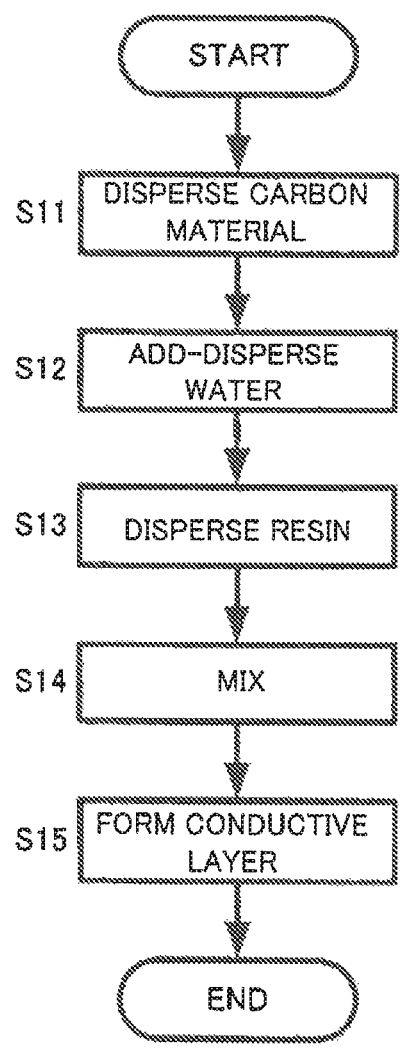
FIG. 1 is a view to explain a method for manufacturing a current collector of the present disclosure.
Figure 2:
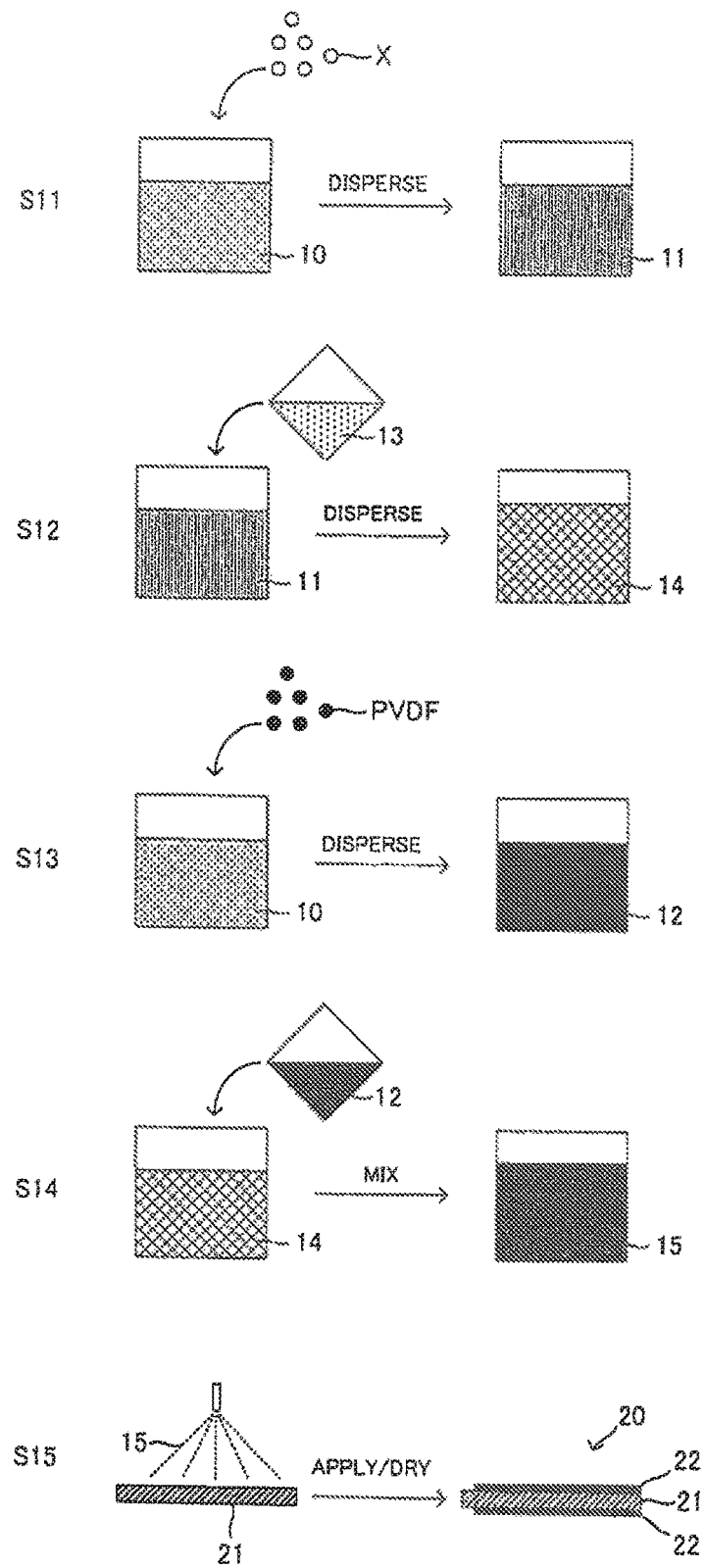
FIG. 2 is a view to explain the method for manufacturing a current collector of the present disclosure.

FIGS. 1 and 2 are views to explain a method for manufacturing a current collector of the present disclosure. The method for manufacturing a current collector of the present disclosure will be explained with reference to FIGS. 1 and 2 adequately. The manufacturing method of a current collector shown in FIGS. 1 and 2 includes a carbon material dispersion step (S11), a water add-dispersion step (S12), a resin dispersion step (S13), a mixing step (S14), and a conductive layer formation step (S15).

1.1. Carbon Material Dispersion Step (S11)

The carbon material dispersion step (hereinafter may be referred to as "S11") is a step of dispersing a carbon material X in an organic solvent 10, to prepare a carbon material dispersion solution 11 including the organic solvent 10 and the carbon material X dispersed in the organic solvent 10. S11 is not particularly limited as long as it is possible to disperse the carbon material X in the organic solvent 10. S11 may be, for example, a step of: adding the carbon material X in a powder form in the organic solvent 10; thereafter repeating an ultrasonic dispersion treatment at a room temperature for 30 seconds for three times, whereby obtaining the carbon material dispersion solution 11. In S11, the temperature at which the carbon material X is dispersed may be in the range of from 0° C. to 80° C. for example. In this range, in view of inhibiting volatilization of the organic solvent 10, the temperature at which the carbon material X is dispersed may be in the range of from 0° C. to 60° C. The time to disperse the carbon material X may be in the range of from 15 seconds to 10 minutes for example. In this range, in view of inhibiting volatilization of the organic solvent 10 due to temperature increase with the ultrasonic dispersion treatment, the time to disperse the carbon material X may be in the range of from 15 seconds to 60 seconds. In S11, the mixing ratio of the organic solvent 10 and the carbon material X may be, by volume, for example organic solvent 10:carbon material X=3:1 to 100:1. The mixing ratio of the organic solvent 10 and the carbon material X may be determined based on the dispersibility of carbon to the organic solvent 10. The organic solvent 10 used in S11 is not particularly limited as long as it is an organic solvent that does not react with the carbon material X. Examples of such an organic solvent include N-methyl-2-pyrrolidone (hereinafter may be referred to as "NMP"), dimethylformamide (DMF), dimethylacetamide (DMA), and dimethylsulfoxide (DMSO). The carbon material X used in S11 is not particularly limited as long as it is a carbon material that can be used for PTC elements and can endure the use environment of the battery provided with the a current collector 20. Examples of such a carbon material include furnace black, Ketjen black and acetylene black.

1.2. Water Add-Dispersion Step (S12)

The water add-dispersion step (hereinafter may be referred to as "S12") is a step of adding water 13 in the carbon material dispersion solution 11 obtained in S11, to disperse the carbon material X and the water 13 in the organic solvent 10, thereby preparing a mixture dispersion solution 14 including the organic solvent 10, and the carbon material X and the water 13 dispersed in the organic solvent 10. The addition and dispersion of the water 13 in S12 is for making PVDF precipitate while uniformly bubbling, in the mixing step carried out later. S12 is not particularly limited as long as the mixture dispersion solution 14 can be prepared. S12 may be a step of: putting the carbon material dispersion solution 11 and the water 13 having a volume ratio of the carbon material dispersion solution 11:the water 13=90:10 in a container, and then repeating an ultrasonic dispersion treatment at a room temperature for 30 seconds for three times, thereby obtaining the mixture dispersion solution 14. In S12, the temperature at which the carbon material dispersion solution 11 and the water 13 are dispersed may be in the range of from 0° C. to 80° C. In the range, in view of inhibiting volatilization of the organic solvent 10, the temperature at which the carbon material dispersion solution 11 and the water 13 are dispersed may be in the range of from 0° C. to 60° C. The time to disperse the carbon material dispersion solution 11 and the water 13 may be in the range of from 15 seconds to 10 minutes for example. In this range, in view of inhibiting volatilization of the organic solvent 10 due to temperature increase with the ultrasonic dispersion treatment, the time to disperse the carbon material dispersion solution and the water 13 may be in the range of from 15 seconds to 60 seconds. In S12, the mixing ratio of the carbon material dispersion solution 11 and the water 13 may be, by volume, for example the carbon material dispersion solution 11:the water 13=99.9:0.1 to 60:40. The mixing ratio of the carbon material dispersion solution 11 and the water 13 may be determined in such a manner that PVDF precipitates uniformly in the mixing step carried out later.

1.3. Resin Dispersion Step (S13)

The resin dispersion step (hereinafter may be referred to as "S13") is a step of dispersing PVDF in the organic solvent 10, to prepare a resin dispersion solution 12 including the organic solvent 10 and PVDF dispersed in the organic solvent 10. S13 is not particularly limited as long as PVDF can be dispersed in the organic solvent 10. S13 may be, for example a step of: adding PVDF in the organic solvent 10; thereafter mixing the obtained material at a room temperature for 24 hours by a stirrer; thereby obtaining the resin dispersion solution 12. In S13, the temperature at which PVDF is dispersed may be for example in the range of from 0° C. to 80° C. In this range, in view of inhibiting volatilization of the organic solvent 10, the temperature at which PVDF is dispersed may be in the range of from 0° C. to 60° C. The time to disperse PVDF may be in the range of from 1 hour to 60 hours. In this range, in view of uniformly dispersing the resin in the organic solvent 10, the time to disperse PVDF may be in the range of from 6 hours to 36 hours. In S13, the mixing ratio of the organic solvent 10 and PVDF may be, by volume, organic solvent 10:PVDF=98:2 to 80:20. The mixing ratio of the organic solvent 10 and PVDF may be determined based on the solubility to the organic solvent 10. The organic solvent used in S13 is not particularly limited as long as it is an organic solvent that does not react with PVDF. Examples of such an organic solvent include NMP, dimethylformamide (DMF), dimethylacetamide (DNA), and dimethylsulfoxide (DMSO).

1.4. Mixing Step (S14)

The mixing step (hereinafter may be referred to as "S14") is a step of mixing the mixture dispersion solution 14 prepared in S12 and the resin dispersion solution 12 prepared in S13, to prepare a composition for conductive layer formation 15. The mixture dispersion solution 14 prepared in S12 is a solution produced by mixing the carbon material dispersion solution 11 prepared in S11 and the water 13. Thus, S14 may be expressed as a step of mixing the carbon material dispersion solution 11 prepared in S11, the resin dispersion solution 12 prepared in S13, and the water 13, to prepare the composition for conductive layer formation 15. PVDF dissolved in the organic solvent 10 precipitates while bubbling, by the water mixed in S14. This makes it change the property of PVDF before and after S14. By carrying out S14, it is possible to disperse (mix) the carbon material X, PVDF whose property is changed, and the water 13, in the organic solvent 10. S14 is not particularly limited as long as it is possible to disperse (mix) the carbon material X, PVDF whose property is changed, and the water 13 in the organic solvent 10. S14 may be for example a step of carrying out an ultrasonic dispersion treatment at a room temperature for seconds, on the mixture dispersion solution 14 and the resin dispersion solution 12 weighed in a manner that the carbon material X and PVDF is carbon material X:PVDF=38:62 by volume, to prepare the composition for conductive layer formation 15 including the organic solvent 10, and the carbon material X, PVDF whose property is changed and the water 13 dispersed in the organic solvent 10. In S14, the temperature at which the composition for conductive layer formation 15 is prepared may be in the range of from 0° C. to 80° C. for example. In this range, in view of inhibiting volatilization of the organic solvent 10, the temperature at which the composition for conductive layer formation 15 is prepared may be in the range of from 0° C. to 60° C. The time to mix the carbon material dispersion solution 11, the water 13, and the resin dispersion solution 12 in S14 may be in the range of from 15 seconds to 10 minutes for example. In this range, in view of inhibiting volatilization of the organic solution 10 due to the temperature increase with the ultrasonic dispersion treatment, the mixing time in S14 may be in the range of from 15 seconds to 60 seconds. In S14, the mixing ratio of the carbon material X and PVDF may be carbon material X:PVDF=5:95 to 60:40 by volume. The mixing ratio of the carbon material X and PVDF may be determined within the range in which the composition for conductive layer formation 15 has a resistance that does not affect the battery performance in the normal use range of the battery and has a high resistance at an abnormal condition at a high temperature.

1.5. Conductive Layer Formation Step (S15)

The conductive layer formation step (hereinafter may be referred to as "S15") is a step of applying the composition for conductive layer formation 15 prepared in S14 to a surface(s) (e.g. both surfaces) of the current collector 21, and thereafter drying it, to produce a current collector with conductive layer 20, in which a conductive layer 22 is formed on the surface(s) of the current collector 21. The method for applying the composition 15 in S15 is not particularly limited as long as it is possible to apply the composition for conductive layer formation 15 on the surface(s) of the current collector 21. Examples of such an application method include blush coating, spray coating, gravure coating, and doctor blade coating. The drying method in S15 is not particularly limited as long as it is possible to dry the composition for conductive layer formation 15 applied on the current collector 21. Examples of the drying method that can be used in S15 include a method of keeping the composition for conductive layer formation 15 in an atmosphere environment at 60° C. to 120° C. for 10 minutes to 120 minutes, to dry the composition for conductive layer formation applied on the current collector 21. The current collector 21 to which the composition for conductive layer formation 15 is to be applied in S15 is not particularly limited as long as it is a current collector that can be used for a battery. Examples of such a current collector include a metal foil and the like including at least one or two or more element selected from the group consisting of Cu, Ni, Al, V, Au, Pt, Mg, Fe, Ti, Co, Cr, Zn, Ge and In.

Via S11 to S15, it is possible to form the conductive layer 22 in which the carbon material (conductive material) X and PVDF whose property is changed are uniformly dispersed, on the surface(s) of the current collector 21. As described later, the resistance of the current collector 20 that has the conductive layer 22 in which the carbon material (conductive material) X and PVDF whose property is changed is uniformly dispersed is nearly same as or lower than the resistance of the current collector including the conductive layer produced by the method of Patent Literature 1 at a temperature of no more than 150° C. However, when the temperature gets over 150° C., the resistance starts to increase, and keeps increasing until the temperature reaches at least 220° C. Thus, by having S11 to S15 for example, it is possible to manufacture the current collector with conductive layer 20 provided with the conductive layer 22 that can keep a high resistance only at a high temperature.

In the manufacturing method of the present disclosure, whether the conductive layer is formed only on the front surface of the current collector or on both surfaces of the current collector may be determined depending on the configuration of the battery provided with the current collector that is manufactured by the above manufacturing method.

In the above explanation, the mixing step (S14) in which the resin dispersion solution 12 and the mixture dispersion solution 14 produced by mixing the carbon material dispersion solution 11 and the water 13 is shown as an example. However, the method for manufacturing a current collector of the present disclosure is not limited to this configuration. The mixing step only has to be a step of mixing the carbon material, water, PVDF and organic solvent. Thus, the mixing step in the method for manufacturing a current collector of the present disclosure may have a configuration in which a solution, produced from the mixture of water and the resin dispersion solution instead of the carbon material dispersion solution, and the carbon material dispersion solution are mixed. In addition, it may have a configuration in which a solution, produced from the mixture of water and the resin dispersion solution, and the above mixture dispersion solution are mixed.

In the above explanation, a configuration, in which the resin dispersion step is carried out after the carbon material dispersion step and the water add-dispersion step, is shown as an example. However, the method for manufacturing a current collector of the present disclosure is not limited to this configuration. The resin dispersion step in the method for manufacturing a current collector of the present disclosure may be carried out before the carbon material dispersion step.

2. Method for Manufacturing Solid Battery

Figure 3:
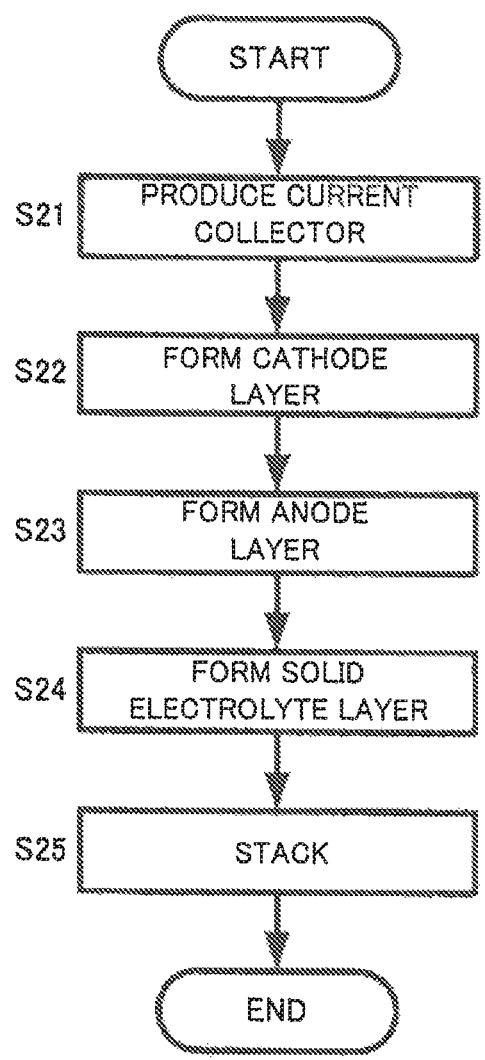
FIG. 3 is a view to explain a method for manufacturing a solid battery of the present disclosure.
Figure 4:
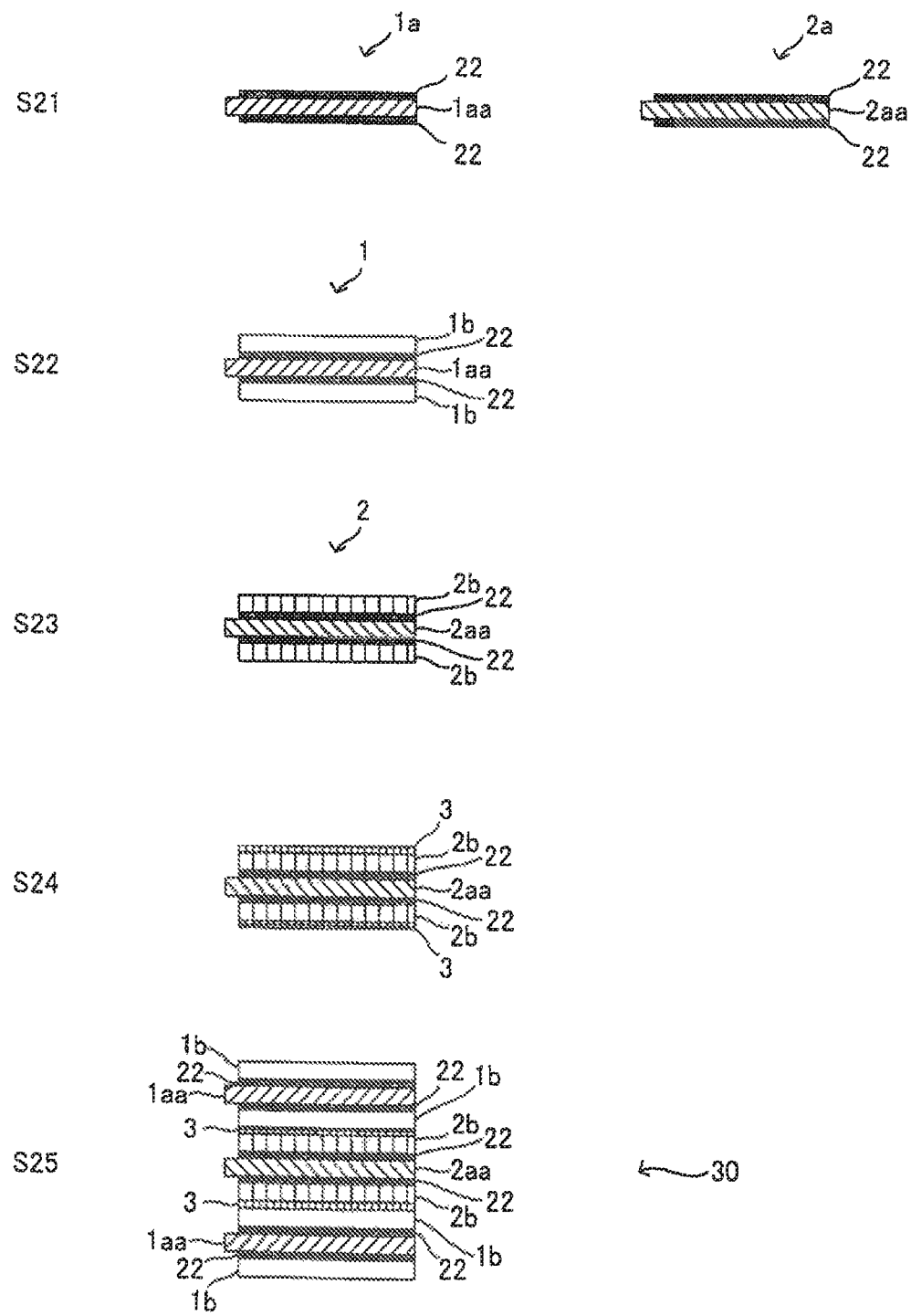
FIG. 4 is a view to explain the method for manufacturing a solid battery of the present disclosure.

FIGS. 3 and 4 are views to explain a method for manufacturing a solid battery of the present disclosure. The method for manufacturing a solid battery of the present disclosure will be explained with reference to FIGS. 1 to 4 adequately. The method for manufacturing a solid battery shown in FIGS. 3 and 4 includes a current collector production step (S21), a cathode layer formation step (S22), an anode layer formation step (S23), a solid electrolyte layer formation step (S24) and a stacking step (S25).

2.1. Current Collector Production Step (S21)

The current collector production step (hereinafter may be referred to as "S21") is a step of producing a cathode current collector with conductive layer 1*a* in which the conductive layer 22 is formed on a surface(s) (for example both surfaces) of a cathode current collector 1*aa* and an anode current collector with conductive layer 2*a* in which the conductive layer 22 is formed on a surface(s) (for example both surfaces) of an anode current collector 2*aa*, by the above method for manufacturing a current collector of the present disclosure. The method for manufacturing a current collector of the present disclosure is the same as explained above, thus the explanation is omitted here.

2.2. Cathode Layer Formation Step (S22)

The cathode layer formation step (hereinafter may be referred to as "S22") is a step of forming a cathode layer 1 including the cathode active material layer 1*b*, the conductive layer 22 and the cathode current collector 1*aa*, in the order mentioned, by forming the cathode active material layer 1*b* on the surface of the conductive layer 22 provided to the cathode current collector with conductive layer 1*a* produced in S21. The configuration of S22 is not particularly limited as long as the cathode active material layer 1*b* can be formed on the surface of the conductive layer 22. S22 may be a step of forming the cathode layer 1 including the cathode active material layer 1*b*, the conductive layer 22 and the cathode current collector 1*aa* (e.g. Al foil) in the order mentioned, via the process of, for example, applying a cathode composition in a slurry form including a cathode active material and a solid electrolyte onto the surface of the conductive layer 22, and thereafter drying it.

2.3. Anode Layer Formation Step (S23)

The anode layer formation step (hereinafter may be referred to as "S23") is a step of forming an anode layer 2 including the anode active material layer 2*b*, the conductive layer 22 and the anode current collector 2*aa* in the order mentioned, by forming the anode active material layer 2*b* on the surface of the conductive layer 22 provided to the anode current collector with conductive layer 2*a* produced in S21. The configuration of S23 is not particularly limited as long as the anode active material layer 2*b* can be formed on the surface of the conductive layer 22. S23 may be a step of forming the anode layer 2 including the anode active material layer 2*b*, the conductive layer 22 and the anode current collector 2*aa* (e.g. Cu foil) in the order mentioned, via the process of applying an anode composition in a slurry form including an anode active material and a solid electrolyte onto the surface of the conductive layer 22, thereafter drying it.

2.4. Solid Electrolyte Layer Formation Step (S24)

The solid electrolyte layer formation step (hereinafter may be referred to as "S24") is a step of forming a solid electrolyte layer to be provided to the solid battery. The configuration of S24 is not particularly limited as long as the solid electrolyte layer can be formed. S24 may be, for example, a step of forming a solid electrolyte layer 3 on a surface of the anode active material layer 2*b*, via the process of applying a solid electrolyte composition in a slurry form including a solid electrolyte and a binder, onto a surface of the anode active material layer 2b produced in S23, thereafter drying it. S24 may also be a step of forming a solid electrolyte layer to a surface of the cathode active material layer, via the process of applying the above-described solid electrolyte composition in a slurry form onto the surface of the cathode active material layer produced in S22, thereafter drying it.

2.5. Stacking Step (S25)

The stacking step (hereinafter may be referred to as "S25") is a step of stacking the cathode layer 1, the solid electrolyte layer 3 and the anode layer 2, in a manner that the solid electrolyte layer 3 formed in S24 is arranged between the cathode active material layer 1b formed in S22 and the anode active material layer 2b formed in S23. For example, via a step of sealing the stack in an exterior body after S21 to S25, it is possible to manufacture the solid battery 30.

The solid battery 30 manufactured via S21 to S25 includes a current collector with conductive layer manufactured by the method for manufacturing a current collector of the present disclosure, on each of the cathode layer and the anode layer. As described above, the current collector with conductive layer includes a conductive layer that can keep a high resistance only at a high temperature. This conductive layer is configured to increase its resistance at a temperature of for example no less than 150° C. due to a heat generation by an internal short circuit occurred at an abnormal condition of the battery, and to keep the state that the resistance is increased. As a result, after the resistance is increased, the electric conduction can be continuously prevented, therefore it is possible to safely stop the battery reaction. Thus, according to the present disclosure, it is possible to manufacture the solid battery 30 configured to easily secure the safety.

In the above explanation related to the method for manufacturing a solid battery of the present disclosure, a configuration in which a current collector manufactured by the method for manufacturing a current collector of the present disclosure is used for the cathode layer and the anode layer is shown as an example. However, the method for manufacturing a solid battery of the present disclosure is not limited to this step. The present disclosure may have a configuration in which the current collector manufactured by the method for manufacturing a current collector of the present disclosure is used only for either one of the cathode layer and the anode layer. For example, when the current collector manufactured by the method for manufacturing a current collector of the present disclosure is used only for the cathode layer, the anode layer formation step may be a step of forming the anode active material layer on a surface of a current collector (e.g. Cu foil) on the surface of which the above conductive layer is not formed. Similarly, when the current collector manufactured by the method for manufacturing a current collector of the present disclosure is used only for the anode layer, the cathode layer formation step may be a step of forming the cathode active material layer on a surface of a current collector (e.g. Al foil) on the surface of which the above conductive layer is not formed. Even though the current collector manufactured by the method for manufacturing a current collector of the present disclosure is used only for either one of the cathode layer and the anode layer, it is possible to manufacture a solid battery provided with the current collector manufactured by the method for manufacturing a current collector of the present disclosure. Thus, it is possible to manufacture a solid battery configured to easily secure the safety.

The present disclosure may have a heat treatment step of carrying out a heat treatment at a temperature in the range of from 120° C. to 165° C. after the conductive layer is formed (in the above method for manufacturing a current collector, after S15. In the above method for manufacturing a solid battery, any point after S21). This makes it possible to keep the resistance low in a normal operation of the solid battery, and to increase the resistance before the battery is excessively heated (e.g. when the temperature of the solid battery is approximately 150° C. to 220° C.) due to an abnormal state of the solid battery kept for a while, to stop the battery reaction. This makes it possible to provide a solid battery configured to have a low resistance of the conductive layer in a normal operation, by which the performance of the solid battery is high, and to increase the resistance of the conductive layer only at a high temperature, to safely stop the battery reaction.

The solid battery manufactured by the present disclosure only has to include the cathode current collector, the cathode active material layer, the solid electrolyte layer, the anode active material layer and the anode current collector, in the order mentioned. Examples of the solid battery manufactured by the present disclosure include: a single layer battery including these layers (cathode current collector/cathode active material layer/solid electrolyte layer/anode active material layer/anode current collector); two of single layer batteries in which the active material layers and the solid electrolyte layers are arranged symmetrically at the upper and lower sides of the current collector positioned at the center (cathode current collector/cathode active material layer/solid electrolyte layer/anode active material layer/anode current collector/anode active material layer/solid electrolyte layer/cathode active material layer/cathode current collector); and a battery in which these plurality of batteries are stacked together.

In the present disclosure, for the cathode active material to be contained in the cathode active material layer, a cathode active material that can be used in solid batteries may be adequately used. Examples of such a cathode active material include layered active materials such as lithium cobalt oxide ($LiCoO_2$) and lithium nickel oxide ($LiNiO_2$), olivine type active materials such as olivine type lithium iron phosphate ($LiFePO_4$), and spinel type active materials such as spinel type lithium manganese oxide ($LiMn_2O_4$). The shape of the cathode active material may be in a particle form and a thin-film form for example. The content of the cathode active material in the cathode active material layer is not particularly limited, and for example it may be in the range of from 40% to 99% by mass.

When a solid battery is manufactured by the present disclosure as described above, not only the solid electrolyte layer, but also the cathode active material layer and the anode active material layer may include a solid electrolyte that can be used for solid batteries, as necessary. Examples of such a solid electrolyte include oxide-based amorphous solid electrolytes such as $Li_2O$—$B_2O_3$—$P_2O_5$ and $Li_2O$—$SiO_2$, sulfide-based amorphous solid electrolytes such as $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $Li_2S$—$P_2S_5$ and $Li_3PS_4$, crystalline oxides and crystalline oxynitrides such as $LiI$, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (w<1) and $Li_{3.6}Si_{0.6}P_{0.4}O_4$. However, in view of making it easy to increase the performance of the solid battery and the like, a sulfide solid electrolyte may be used for the solid electrolyte.

When a sulfide solid electrolyte is used as the solid electrolyte, the cathode active material may be coated with an ion conductive oxide, in view of making it easy to prevent the increase in the battery resistance by making it difficult to form a high resistance layer at the interface between the cathode active material and the solid electrolyte. Examples of the lithium ion conductive oxide to coat the cathode active material include an oxide represented by the general formula $Li_xAO_y$ (A is B, C, Al, Si, P, S, Ti, Zr, Nb, Mo, Ta or W, x and y are each a positive number). Specifically, $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$ and $Li_2WO_4$ and the like may be given. The lithium ion conductive oxide may be a complex oxide. As the complex oxide to coat the cathode active material, any combination of the above-described lithium ion conductive oxides may be used. For example, $Li_4SiO_4$—$Li_3BO_3$, $Li_4SiO_4$—$Li_3PO_4$ and the like may be used. When the surface of the cathode active material is coated with an ion conductive oxide, the ion conductive oxide only has to coat at least part of the cathode active material, and may coat the whole surface of the cathode active material. The thickness of the ion conductive oxide to coat the cathode active material may be for example in the range of from 0.1 nm to 100 nm, and may be in the range of from 1 nm to 20 nm. The thickness of the ion conductive oxide may be measured by means of a transmittance electron microscope (TEM) and the like.

The cathode active material layer may be produced with a binder that can be contained in cathode layers of solid batteries. Examples of such a binder include acrylonitrile butadiene rubber (ABR), butadiene rubber (BR), polyvinylidene fluoride (PVDF) and styrene butadiene rubber (SBR).

The cathode active material layer may further contain a conductive material that improves the conductivity. Examples of the conductive material that can be contained in the cathode active material layer include carbon materials such as vapor-grown carbon fiber, acetylene black (AB), Ketjen black (KB), carbon nanotube (CNT) and carbon nanofiber (CNF), and metal materials that can endure the use environment of the solid battery. When the cathode active material layer is produced with a cathode composition in a slurry form adjusted by dispersion of the above cathode active material, solid electrolyte and binder in a liquid, examples of the liquid that can be used include heptane, and a non-polar solvent may be used. The thickness of the cathode active material layer may be for example in the range of from 0.1 μm to 1 mm, and may be in the range of from 1 μm to 100 μm. In order to make it easy to increase the performance of the solid battery, the cathode active material layer may be produced via a process of pressing. In the present disclosure, the pressure in pressing the cathode active material layer may be approximately 100 MPa.

As the anode active material to be contained in the anode active material layer, an anode active material that can be used in solid batteries may be adequately used. Examples of such an anode active material include carbon active materials, oxide active materials and metal active materials. The carbon active material is not particularly limited as long as it contains carbon, and examples thereof include mesocarbon micro beads (MCMB), highly orientated graphite (HOPG), hard carbon and soft carbon. Examples of the oxide active material include $Nb_2O_5$, $Li_4Ti_5O_{12}$ and SiO. Examples of the metal active material include In, Al, Si and Sn. In addition, as the anode active material, a lithium-containing metal active material may be used. The lithium-containing metal active material is not particularly limited as long as it contains at least Li, and may be a Li metal, or a Li alloy. Examples of Li alloy include an alloy containing Li and at least one kind from In, Al, Si and Sn. The shape of the anode active material may be in a particle form and in a thin-film form, for example. The content of the anode active material in the anode active material layer is not particularly limited, and for example it may be in the range of from 40% to 99% by mass.

Further, the anode active material layer may contain a binder to bond the anode active material and the solid electrolyte, and a conductive material to improve the conductivity. Examples of the binder and the conductive material that can be contained in the anode active material layer include the above-described binders and conductive materials that can be contained in the cathode active material layer. When the anode active material layer is produced with an anode composition in a slurry form adjusted by dispersion of the above-described anode active material etc. in a liquid, examples of the liquid to disperse the anode active material etc. may include heptane, and a non-polar solvent may be used. The thickness of the anode active material layer may be for example in the range of from 0.1 μm to 1 mm, and may be in the range of from 1 μm to 100 μm. In order to easily improve the performance of the solid battery, the anode active material layer may be produced via a process of pressing. In the present disclosure, the pressure in pressing the anode active material layer may be no less than 200 MPa, and may be approximately 400 MPa.

As the solid electrolyte to be contained in the solid electrolyte layer, a solid electrolyte that can be used in solid batteries may be adequately used. Examples of such a solid electrolyte include the above-described solid electrolytes and the like that can be contained in the cathode active material layer and the anode active material layer. In addition, the solid electrolyte layer may contain a binder to bond the solid electrolytes to each other, in view of providing plasticity and the like. Examples of such a binder include the above-described binders and the like that can be contained in the cathode active material layer. However, in view of making it possible to form the solid electrolyte layer including a solid electrolyte not excessively aggregated but uniformly dispersed and the like, the content of the binder in the solid electrolyte layer may be no more than 5 mass %. When the solid electrolyte layer is produced via a process of applying a solid electrolyte composition in a slurry form adjusted by dispersion of the above-described solid electrolyte etc. in a liquid, to the cathode active material layer, the anode active material layer, and the like, examples of the liquid to disperse the solid electrolyte etc. include heptane, and a non-polar solvent may be used. The content of the solid electrolyte material in the solid electrolyte layer may be for example no less than 60%, may be no less than 70%, and may be no less than 80%, by mass. The thickness of the solid electrolyte layer greatly differs depending on the structure of the battery. The thickness of the solid electrolyte layer may be for example in the range of from 0.1 μm to 1 mm, and may be in the range of from 1 μm to 100 μm.

For the current collector to be provided to the cathode layer and the anode layer, metal that can be used as a current collector of solid batteries may be adequately used. Examples of such metal include a metal material including one or two or more element selected from the group consisting of Cu, Ni, Al, V, Au, Pt, Mg, Fe, Ti, Co, Cr, Zn, Ge and In.

As the exterior body to seal the cathode layer, the solid electrolyte layer and the anode layer, a laminate film that can be used for solid batteries and the like may be used.

Examples of such a laminate film include a resin laminate film and a film in which metal is evaporated to a resin laminate film.

In the above explanation regarding the present disclosure, materials that can be used for an solid battery that is a lithium ion secondary battery are mainly shown as examples. However, the solid battery of the present disclosure is not limited to a lithium ion secondary battery. The solid battery manufactured by the present disclosure may have a configuration in which ions other than lithium ion transfer between the cathode active material layer and the anode active material layer. Examples of such ions include sodium ion and potassium ion. If the battery has a configuration in which ions other than lithium ion transfer, the cathode active material, solid electrolyte and anode active material may be adequately chosen depending on the ion to transfer.

The method for manufacturing a current collector of the present disclosure and the method for manufacturing a solid battery provided with the current collector manufactured by the method for manufacturing a current collector of the present disclosure is explained above. As explained above, the current collector manufactured by the method for manufacturing a current collector of the present disclosure may be used in manufacturing a solid battery. The current collector may also be used in manufacturing a battery that includes an electrolyte solution.

EXAMPLES (1) Manufacture of Current Collector

Example

Furnace black (manufactured by TOKAI CARBON CO., LTD.) of 66 nm in average primary particle diameter, which is a carbon material, and PVDF (Kureha KF polymer L#9130, manufactured by KUREHA CORPORATION) were used to manufacture a current collector with conductive layer. Specifically, furnace black and PVDF were weighed so that furnace black:PVDF=20:80 by volume. With the weighed materials and NMP (manufactured by NIPPON REFINE Co., Ltd.), the above S11 to S15 were carried out, whereby a current collector of Example was manufactured. More specifically, the current collector of Example was manufactured via S11 to S15 under the following conditions and a heat treatment after S15.

The mixing ratio of the NMP and the furnace black when the above S11 was carried out was NMP:furnace black=10:1 by volume. The furnace black in a powder form was added in the NMP, thereafter subjected to an ultra sonic dispersion treatment at a room temperature for 30 seconds for three times, whereby a carbon material dispersion solution was prepared.

The mixing ratio of the carbon material dispersion solution and water when the above S12 was carried out was carbon material dispersion solution:water=88:12 by volume. The carbon material dispersion solution and water to have the above mixing ratio were put in a container, and thereafter subjected to an ultra sonic dispersion treatment at a room temperature for 30 seconds for three times, whereby a mixture dispersion solution was prepared.

The mixing ratio of the NMP and the PVDF when the above S13 was carried out was NMP:PVDF=93:7. The PVDF was added in the NMP, and then they were mixed by a stirrer at a room temperature for 24 hours, whereby a resin dispersion solution was prepared.

The mixing ratio of the mixture dispersion solution and the resin dispersion solution when the above S14 was carried out was set in a manner to be furnace black contained in the mixture dispersion solution:PVDF contained in the resin dispersion solution=20:80 by volume ratio. The mixture dispersion solution and the resin dispersion solution whose amounts satisfied the above condition were put in a container, and subjected to an ultra sonic dispersion treatment at a room temperature for 30 seconds, whereby a composition for conductive layer formation was prepared.

When the above S15 was carried out, an Al foil of 15 μm in thickness was used as a current collector. The composition for conductive layer formation was applied on a surface of the Al foil such that the thickness of the conductive layer after dried was 10 μm. Thereafter, the obtained material was dried in a stationary drying furnace at 100° C. for 1 hour, whereby the conductive layer was formed on the surface of the current collector.

The current collector, on the surface of which the conductive layer was formed, was put in a thermostatic bath, and subjected to a heat treatment of keeping the current collector at 140° C. for 2 hours, whereby a current collector of Example was manufactured.

Comparative Example 1

A current collector of Comparative Example 1 was manufactured in the same way as in Example 1, except that the conductive layer was formed without water, that is, without the above S12.

Comparative Example 2

A current collector on the surface of which the conductive layer was formed without the above S12 in the same way as in Comparative Example 1 was immersed in distilled water at normal temperature for 72 hours. After that, the current collector was taken out from distilled water, and kept in a thermostatic bath at a 60° C. for 12 hours to be dried, whereby a current collector of Comparative Example 2 was manufactured.

(2) Resistance Value Measurement

Figure 5A:
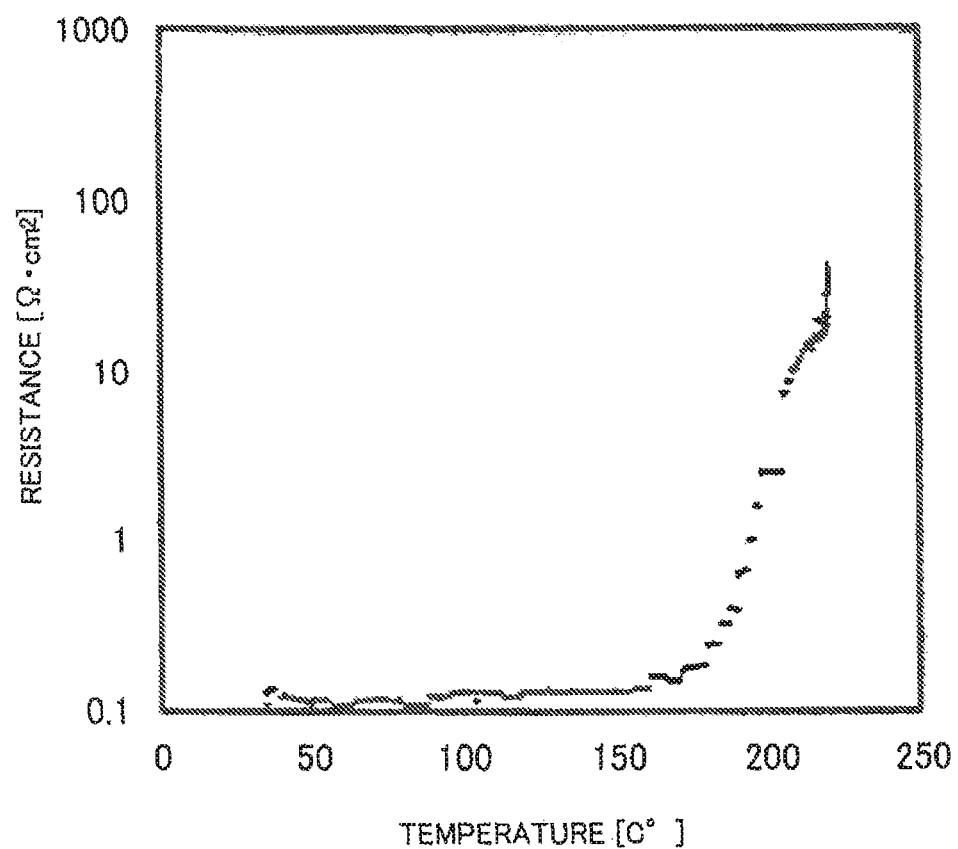
FIG. 5A is a view to show a result of a resistance measurement of the current collector of Example.
Figure 5B:
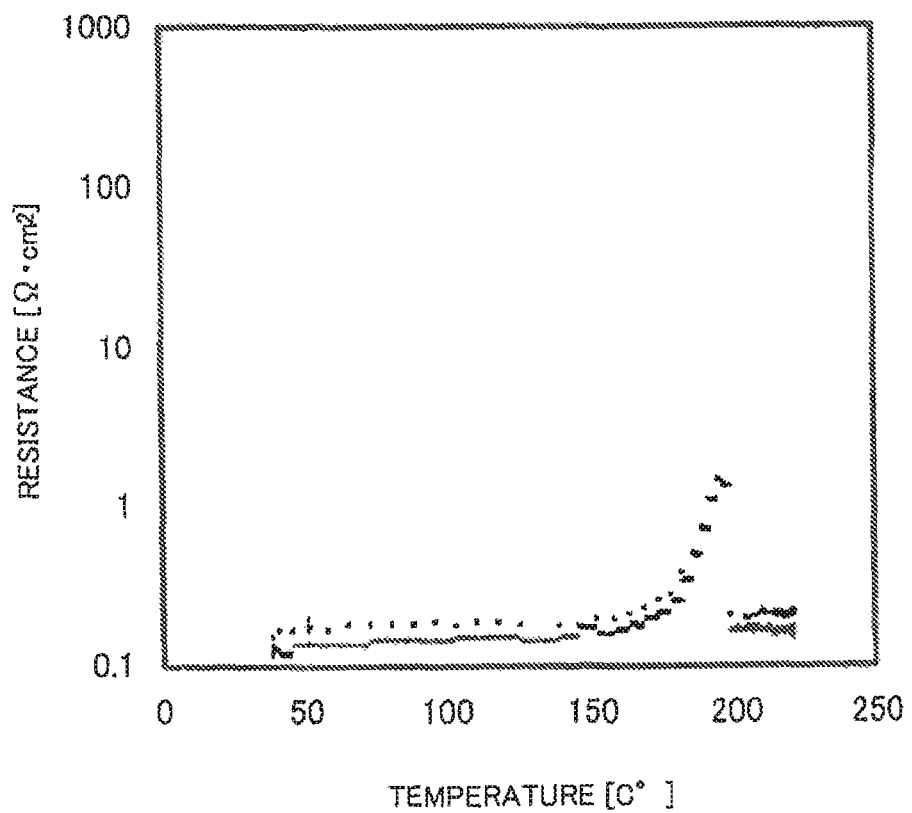
FIG. 5B is a view to show a result of a resistance measurement of the current collector of Comparative Example 1.
Figure 5C:
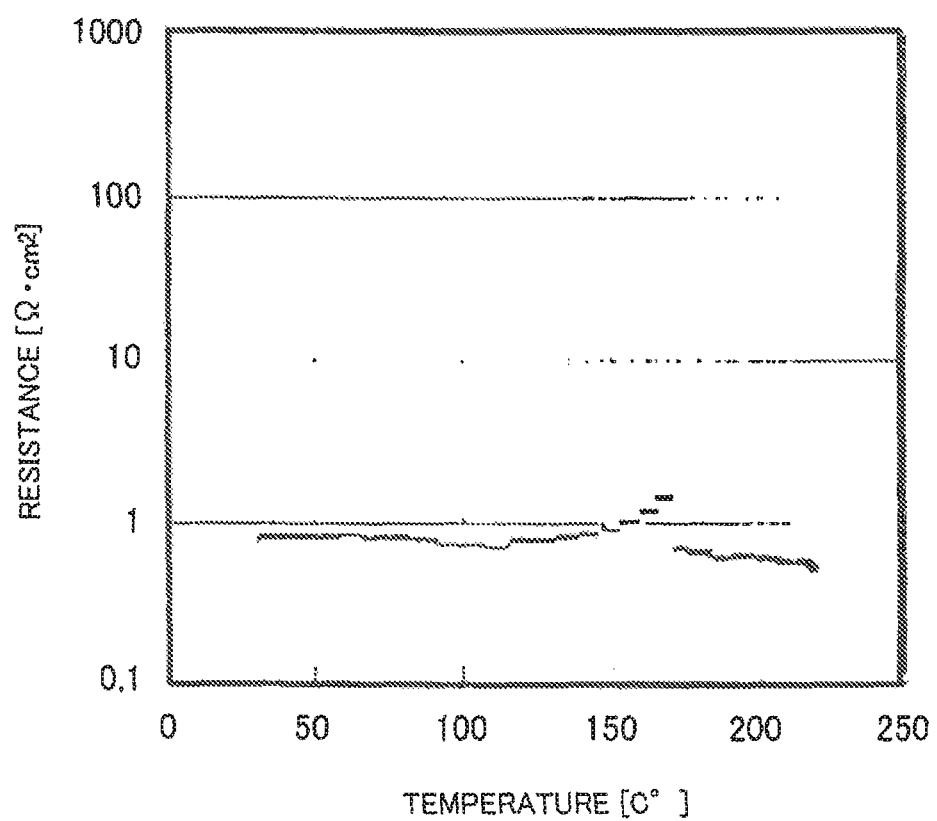
FIG. 5C is a view to show a result of a resistance measurement of the current collector of Comparative Example 2.

Each current collector of Example and Comparative Examples 1 and 2 was cut out into a round shape of 11.28 mm in diameter (area 1 $cm^2$). Thereafter, an Al foil was lapped over the conductive layer side of the current collector. The foil and current collector were sandwiched by cylindrical-shaped terminals of same diameter and fixed in a jig. After that, the jig to which a restrictive pressure of 15 MPa was applied was installed in a thermostatic bath, and the electrical resistance when the temperature was increased at a fixed increase rate was measured. Specifically, 1 mA of constant current conduction was made between the terminals, and the voltage between the terminals when the conduction was made was measured, whereby the resistance value was calculated. The results are shown in FIGS. 5A to 5C. FIG. 5A is a graph to show the resistance measurement results of the current collector of Example. FIG. 5B is a graph to show the resistance measurement results of Comparative Example 1, and FIG. 5C is a graph to show the resistance measurement results of Comparative Example 2.

As shown in FIG. 5A, the current collector of Example manufactured by the method for manufacturing a current collector of the present disclosure started to increase its resistance when the temperature got over 150° C., kept increasing the resistance until the temperature reached 220° C., and kept a high resistance value even when the current collector was kept under the environment of 220° C. of temperature. It is considered that this is because the conductive layer provided to the current collector of Example contained PVDF whose property was changed, therefore the viscosity at a high temperature increased.

In contrast, as shown in FIG. 5B, the current collector of Comparative Example 1 manufactured without using water when the composition for conductive layer formation was prepared, showed a similar behavior as the current collector of Example until the temperature reached around 190° C. However, when the temperature got over 190° C. the resistance value rapidly decreased, and the resistance kept the low value after the rapid decrease even though the temperature increased more.

Meanwhile, as shown in FIG. 5C, the current collector of Comparative Example 2 manufactured without using water when the composition for conductive layer formation was prepared and whose conductive layer was immersed in distilled water after formed, had a larger resistance value at a temperature of no more than 150° C., than the resistance values of current collector of Example and the current collector of Comparative Example 1. Further, the current collector of Comparative Example 2 increased its resistance value when the temperature got over 150° C. until the temperature reached around 170° C. However, when the temperature got over 170'C, the resistance value decreased. When the temperature was kept increased, the resistance value further decreased.

As explained above, the current collector manufactured by the manufacturing method of a current collector of the present disclosure was able to keep a high resistance only at a high temperature of over 150° C. Thus, according to the present disclosure, it is possible to provide a method for manufacturing a current collector provided with a conductive layer that can keep a high resistance only at a high temperature, and a method for manufacturing a solid battery provided with the current collector manufactured by the method.

REFERENCES SIGN LIST

X carbon material
1a cathode current collector with conductive layer
1aa cathode current collector
1b cathode active material layer
2a anode current collector with conductive layer
2aa anode current collector
2b anode active material layer
3 solid electrolyte layer
10 organic solvent
11 carbon material dispersion solution
12 resin dispersion solution
13 water
14 mixture dispersion solution
15 composition for conductive layer formation
20 current collector with conductive layer
21 current collector
22 conductive layer
30 solid battery

The invention claimed is:

1. A method for manufacturing a current collector having a conductive layer, the method comprising:
    dispersing a carbon material in a first organic solvent to prepare a carbon material dispersion solution;
    dispersing polyvinylidene fluoride in a second organic solvent to prepare a resin dispersion solution;
    mixing the carbon material dispersion solution, the resin dispersion solution, and water to precipitate the polyvinylidene fluoride in the resin dispersion solution with water, such that a composition for forming the conductive layer is prepared; and
    applying the composition for forming the conductive layer on the current collector, and thereafter drying the composition to form the conductive layer on the surface of the current collector.

2. The method according to claim 1, further comprising carrying out a heat treatment at a temperature in the range of from 120° C. to 165° C., after the conductive layer is formed on the surface of the current collector.

3. The method according to claim 1, wherein in the mixing, the polyvinylidene fluoride precipitates with bubbles.

4. The method according to claim 1, wherein a ratio of the carbon material and the polyvinylidene fluoride (carbon material: polyvinylidene fluoride) is 5:95 to 60:40 by volume.

5. The method according to claim 1, wherein the first solvent and the second solvent are the same solvent.

6. The method according to claim 1, wherein the first solvent and the second solvent are different solvents.

7. A method for manufacturing a solid battery, the solid battery comprising:
    a cathode layer including a cathode active material layer and a cathode current collector;
    an anode layer including an anode active material layer and an anode current collector; and
    a solid electrolyte layer arranged between the cathode active material layer and the anode active material layer,
    wherein at least one of the cathode current collector and the anode current collector is the current collector having the conductive layer manufactured by the method according to claim 1,
    the method for manufacturing a solid battery comprising:
    when the cathode current collector is the current collector having the conductive layer manufactured by the method according to claim 1, stacking the cathode active material layer and the current collector having the conductive layer in a manner to contact the cathode active material layer with the conductive layer formed on the surface of the current collector;
    when the anode current collector is the current collector having the conductive layer manufactured by the method according to claim 1, stacking the anode active material layer and the current collector having the conductive layer in a manner to contact the anode active material layer with the conductive layer formed on the surface of the current collector.

* * * * *